United States Patent
Yu et al.

(10) Patent No.: US 11,201,537 B2
(45) Date of Patent: Dec. 14, 2021

(54) METHOD FOR SUPPRESSING COMMON MODE IMPULSE CURRENT FOR INVERTER GENERATED WHEN SWITCHING ON ALTERNATING CURRENT SWITCH AND APPLICATION DEVICE THEREOF

(71) Applicant: SUNGROW POWER SUPPLY CO., LTD., Anhui (CN)

(72) Inventors: Yanfei Yu, Anhui (CN); Hua Ni, Anhui (CN); Yang Bai, Anhui (CN); Menglin Cao, Anhui (CN)

(73) Assignee: SUNGROW POWER SUPPLY CO., LTD., Anhui (JP)

( * ) Notice: Subject to any disclaimer, the term of this patent is extended or adjusted under 35 U.S.C. 154(b) by 0 days.

(21) Appl. No.: 16/835,977

(22) Filed: Mar. 31, 2020

(65) Prior Publication Data

US 2020/0373830 A1    Nov. 26, 2020

(30) Foreign Application Priority Data

May 22, 2019 (CN) .......................... 201910429500.X

(51) Int. Cl.
| | |
|---|---|
| *H02M 1/32* | (2007.01) |
| *H02J 3/38* | (2006.01) |
| *H02M 7/539* | (2006.01) |

(52) U.S. Cl.
CPC ............. *H02M 1/32* (2013.01); *H02J 3/381* (2013.01); *H02M 7/539* (2013.01); *H02J 2300/24* (2020.01); *H02J 2300/28* (2020.01)

(58) Field of Classification Search
CPC .......... H02M 1/32; H02M 7/539; H02J 3/381; H02J 2300/28; H02J 2300/24
See application file for complete search history.

(56) References Cited

U.S. PATENT DOCUMENTS 6,556,459 B2 * 4/2003 Okui ...................... H02J 9/062
                                                   363/37
9,912,146 B1    3/2018 Wang et al.
(Continued)

FOREIGN PATENT DOCUMENTS

| CN | 2406412 Y | 11/2000 |
| CN | 1452309 A | 10/2003 |

(Continued)

OTHER PUBLICATIONS

EPO Extended European Search Report for corresponding EP Application No. 20166030.5, dated Jul. 29, 2020.

*Primary Examiner* — Dinh T Le
(74) *Attorney, Agent, or Firm* — Cantor Colburn LLP

(57) ABSTRACT

A method for suppressing a common mode impulse current for an inverter generated when an alternating current switch is switched on and a device for applying the method are provided. Before the alternating current switch is switched on for the inverter, a target value of a common mode voltage between the inverter and ground is calculated based on at least one of a voltage between an alternating current port and ground, a voltage between the inverter and ground and a voltage across the alternating current switch sampled in real time. Then, a compensation power supply arranged between a main circuit of the inverter and ground is controlled to change the common mode voltage to the target value, so that a common mode voltage difference between two ends of the alternating current switch is zero. Subsequently, the inverter is controlled to switch on the alternating current switch.

7 Claims, 6 Drawing Sheets

(56) References Cited

U.S. PATENT DOCUMENTS

| 10,892,623 B2* | 1/2021 | Guerriero | H02J 3/388 |
| 2013/0121029 A1 | 5/2013 | Coors et al. | |
| 2016/0268923 A1 | 9/2016 | Bremicker | |

FOREIGN PATENT DOCUMENTS

| CN | 102916437 A | 2/2013 |
| CN | 106487208 A | 3/2017 |
| CN | 107317504 A | 11/2017 |
| CN | 107492905 A | 12/2017 |
| CN | 108418549 A | 8/2018 |
| DE | 102011055220 A1 | 5/2013 |
| JP | 2015126593 A | 7/2015 |
| KR | 20190051331 A | 5/2019 |
| WO | 2015074964 A1 | 5/2015 |
| WO | 2015074965 A1 | 5/2015 |
| WO | 2017162892 A1 | 9/2017 |

* cited by examiner

ND FOR SUPPRESSING COMMON
METHOD FOR SUPPRESSING COMMON MODE IMPULSE CURRENT FOR INVERTER GENERATED WHEN SWITCHING ON ALTERNATING CURRENT SWITCH AND APPLICATION DEVICE THEREOF

CROSS REFERENCE TO RELATED APPLICATION

The present application claims the priority under 35 U.S.C. § 119 to Chinese Patent Application No. 201910429500.X, titled "METHOD FOR SUPPRESSING COMMON MODE IMPULSE CURRENT FOR INVERTER GENERATED WHEN SWITCHING ON ALTERNATING CURRENT SWITCH AND APPLICATION DEVICE THEREOF", filed on May 22, 2019 with the Chinese Patent Office, which is incorporated herein by reference in its entirety.

FIELD

The present disclosure relates to the technical field of automatic control, particularly to a method for suppressing a common mode impulse current for an inverter generated when an alternating current switch is switched on, and a device for applying the method.

BACKGROUND

In a new energy grid-connected power generation system such as a photovoltaic power generation system, a wind power generation system, and an energy storage system, transmission and conversion of energy is performed by an inverter. As shown in FIG. 1, in the inverter, a mechanical alternating current switch such as a relay or a contactor is arranged between an alternating current filter and an interface for a power grid. When the alternating current switch is switched on, the inverter is connected to the power grid, thereby performing the conversion and transmission of energy.

In order to avoid an impulse current resulting from a voltage difference between two ends of the alternating current switch when the alternating current switch is switched on, before the alternating current switch is switched on, the inverter may generate a voltage with an identical frequency, phase and amplitude to those of a voltage of the power grid in an alternating current capacitor of the inverter (namely a differential mode capacitor of the alternating current filter), via a DC/AC converter of the inverter.

However, with the above solution, only a differential mode impulse current can be suppressed. If there is a common mode voltage difference between two ends of the alternating current switch before the alternating current switch is switched on, the common mode impulse current remains when the alternating current switch is switched on. In an inverter topology with an AC side capacitor connected to a DC side midpoint, for example, in a three-phase T-type three-level inverter with an AC side capacitor connected to a midpoint of a direct current bus as shown in FIG. 1, a common mode impulse current generated when the alternating current switch is switched on sequentially passes through an alternating current capacitor, a direct current bus capacitor, an equivalent direct current capacitor-to-ground (for example, a Y capacitor) and/or a parasitic capacitor (which is uniformly expressed by C1 in FIG. 1) and ground, then the common mode impulse current passes through a power grid, a Residual Current Device (RCD) and an alternating current switch, and returns to the alternating current side, as shown by a dotted line. Since a corresponding current loop does not pass through an alternating current inductor (namely an inductor in the alternating current filter), the impulse current can be very large. Besides, as an equivalent capacitance-to-ground of a power generation system (for example, a Y capacitor) and a parasitic capacitance increases, the common mode impulse current increases. The common mode impulse current may trigger an external leakage current protector (namely the RCD in FIG. 1) to open, resulting in that the inverter is disconnected from the power grid; or may generate a transient interference on a control system and driving waveforms of the inverter, resulting in an operation malfunction of the inverter.

SUMMARY

A method for suppressing a common mode impulse current for an inverter generated when an alternating current switch is switched on and a device for applying the method are provided according to the present disclosure, to avoid the problem that the inverter is disconnected from the power grid and in a fault condition, due to a common mode impulse current for the inverter generated when the alternating current switch is switched on.

The technical solutions of the present disclosure are provided as follows.

In a first aspect of the present disclosure, a method for suppressing a common mode impulse current for an inverter generated when an alternating current switch is switched on is provided, which includes: calculating, before the alternating current switch is switched on for the inverter, a target value of a common mode voltage between the inverter and ground, based on at least one of a voltage between an alternating current port and ground, a voltage between the inverter and ground, and a voltage across the alternating current switch sampled in real time; controlling a compensation power supply arranged between a main circuit of the inverter and ground to change the common mode voltage between the inverter and ground to the target value; and controlling the inverter to switch on the alternating current switch.

In an embodiment, after controlling a compensation power supply arranged between a main circuit of the inverter and ground to change the common mode voltage between the inverter and ground to the target value, the method further includes: controlling to switch off a switch in series connection with the compensation power supply and arranged between the main circuit of the inverter and ground.

In an embodiment, before controlling the inverter to switch on the alternating current switch, the method further includes: controlling a DC/AC converter in the inverter to operate based on the sampled voltage between the alternating current port and ground, so that a voltage waveform of an alternating current capacitor in the inverter is identical to a voltage waveform of the alternating current port.

In an embodiment, in a case that the alternating current port of the inverter is connected to a TN type grid, the target value is zero.

In an embodiment, in a case that the alternating current port of the inverter is connected to an IT type grid, the target value equals to an average value of voltages between the alternating current port of the inverter and ground.

In an embodiment, the method further includes: controlling, if a direct current port of the inverter is connected to a P-type photovoltaic module, the compensation power supply to change both a voltage between a positive pole of the direct current port and ground and a voltage between a negative pole of the direct current port and ground to positive voltages, in a case that it is unnecessary to switch on the alternating current switch for the inverter; and controlling, if a direct current port of the inverter is connected to an N-type photovoltaic module, the compensation power supply to change both the voltage between the positive pole of the direct current port of the inverter and ground and the voltage between the negative pole of the direct current port of the inverter and ground to negative voltages, in a case that it is unnecessary to switch on the alternating current switch for the inverter.

In an embodiment, one end of the compensation power supply is grounded and another end of the compensation power supply is connected with any one of a positive pole of a direct current bus, a negative pole of the direct current bus, a midpoint of the direct current bus, a positive pole of a direct current port, a negative pole of the direct current port and an alternating current side of a DC/AC converter of the inverter.

In a second aspect of the present disclosure, an inverter is further provided, which includes a main circuit and a controller. The main circuit includes a direct current port, a direct current bus capacitor, a DC/AC converter, an alternating current filter, an alternating current switch, an alternating current port and a compensation power supply. Outside of the direct current port is connected with a direct current power supply or a direct current load. The direct current bus capacitor is connected between a positive pole of a direct current bus and a negative pole of the direct current bus of the inverter. A direct current side of the DC/AC converter is connected with the positive pole and the negative pole of the direct current bus of the inverter. An alternating current side of the DC/AC converter is connected with one end of the alternating current switch through the alternating current filter. Another end of the alternating current switch is connected with inside of the alternating current port. Outside of the alternating current port is connected with an alternating current power supply or an alternating current load. The compensation power supply is arranged between the main circuit and ground, and is configured to output a voltage to the main circuit in response to the control of the controller. The controller is configured to perform the method for suppressing a common mode impulse current for an inverter generated when an alternating current switch is switched on according to the first aspect.

In an embodiment, the main circuit further includes a DC/DC converter arranged between inside of the direct current port and the direct current bus.

In a third aspect of the present disclosure, a new energy grid-connected power generation system is further provided, which includes a direct current power supply and the inverter according to the second aspect. The direct current power supply is connected with a direct current port of the inverter. The direct current power supply is at least one of a photovoltaic array, a wind power generation system and an energy storage system.

With the method for suppressing a common mode impulse current for an inverter generated when the alternating current switch is switched on, before the alternating current switch is switched on for the inverter, a target value of a common mode voltage between the inverter and ground is calculated based on at least one of a voltage between an alternating current port and ground, a common mode voltage between the inverter and ground and a voltage across the alternating current switch sampled in real time. Then, a compensation power supply arranged between a main circuit of the inverter and ground is controlled to change the common mode voltage between the inverter and ground to the target value, so that a common mode voltage difference between two ends of the alternating current switch is zero. Subsequently, the inverter is controlled to switch on the alternating current switch, thereby avoiding a common mode impulse current. In this way, false triggering of a trip resulting from an external leakage current protector, which is caused by the common mode impulse current generated when the alternating current switch is switched on, and a transient interference on the controlling system are avoided.

BRIEF DESCRIPTION OF THE DRAWINGS

For clearer illustration of the technical solutions according to embodiments of the present disclosure or conventional technologies, the drawings to be applied in embodiments of the present disclosure or conventional technologies are briefly described hereinafter. Apparently, the drawings in the following descriptions illustrate only some embodiments of the present disclosure, and other drawings may be obtained by those skilled in the art based on the provided drawings without creative efforts.

DETAILED DESCRIPTION

Technical solutions of embodiments of the present disclosure are clearly and completely described below in conjunction with the drawings of the embodiments of the present disclosure. Apparently, the embodiments described in the following are only some embodiments of the present disclosure, rather than all the embodiments. Any other embodiments obtained by those skilled in the art based on the embodiments in the present disclosure without any creative effort fall within the protection scope of the present disclosure.

A method for suppressing a common mode impulse current for an inverter generated when an alternating current switch is switched on is provided according to the present disclosure, to avoid the problem that the inverter is disconnected from the power grid and in a fault condition, due to a common mode impulse current for the inverter generated when the alternating current switch is switched on.

Illustration is made by taking a three-phase T-type three-level inverter with an alternating current capacitor connected to a midpoint of a direct current bus for example. The inverter includes a main circuit and a controller.

Figure 1:
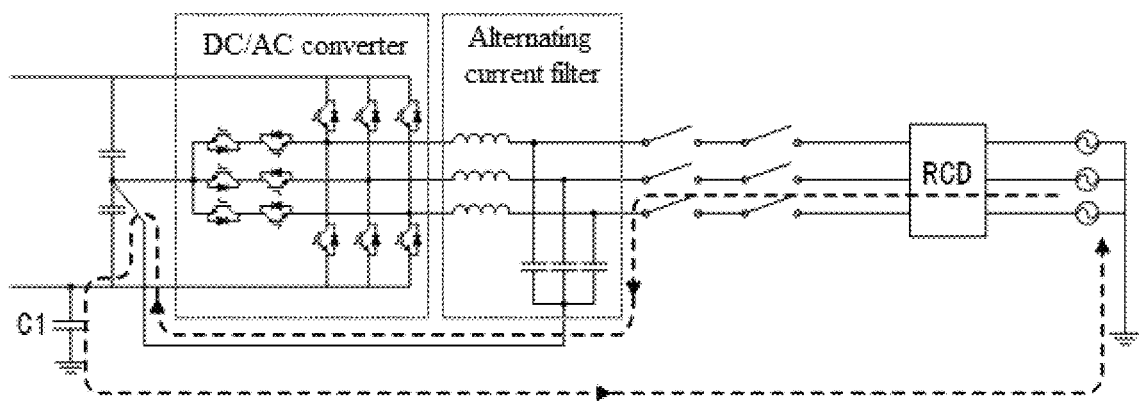
FIG. 1 is a schematic structural diagram of a main circuit of a three-phase T-type three-level inverter according to conventional technologies.
Figure 2A:
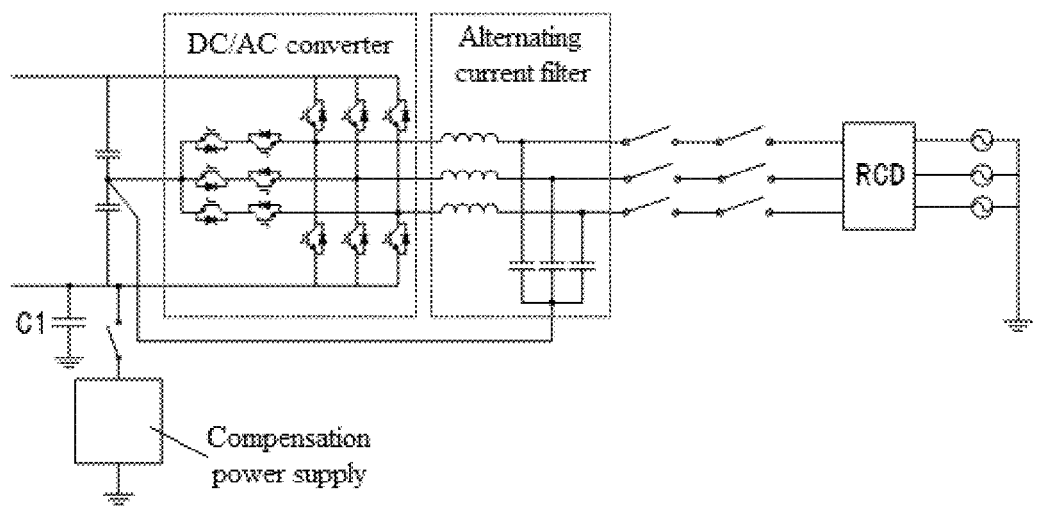
FIG. 2A is a schematic structural diagram of a main circuit of a three-phase T-type three-level inverter connected with a TN type grid according to an embodiment of the present disclosure.
Figure 2B:
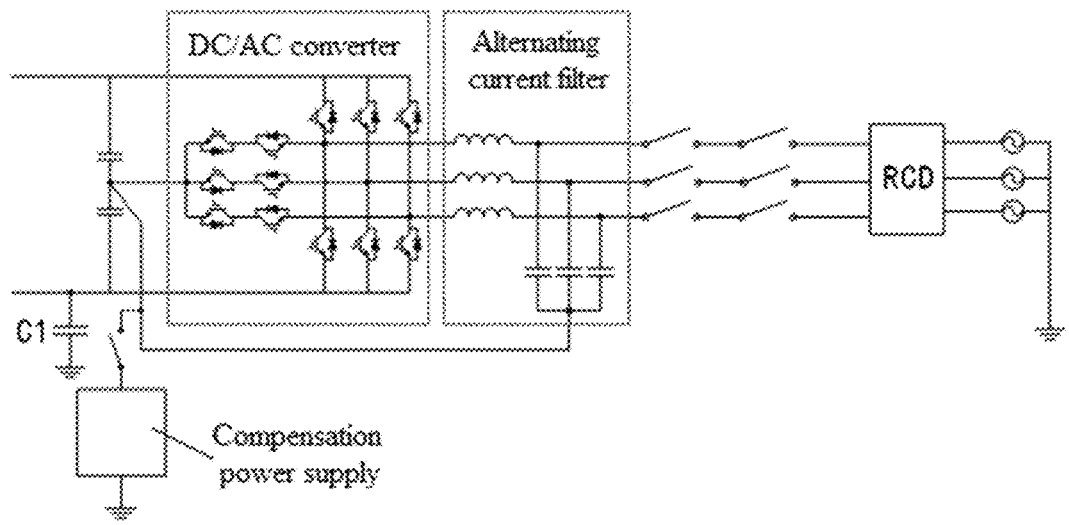
FIG. 2B is a schematic structural diagram of another main circuit of the three-phase T-type three-level inverter connected with the TN type grid according to an embodiment of the present disclosure.
Figure 2C:
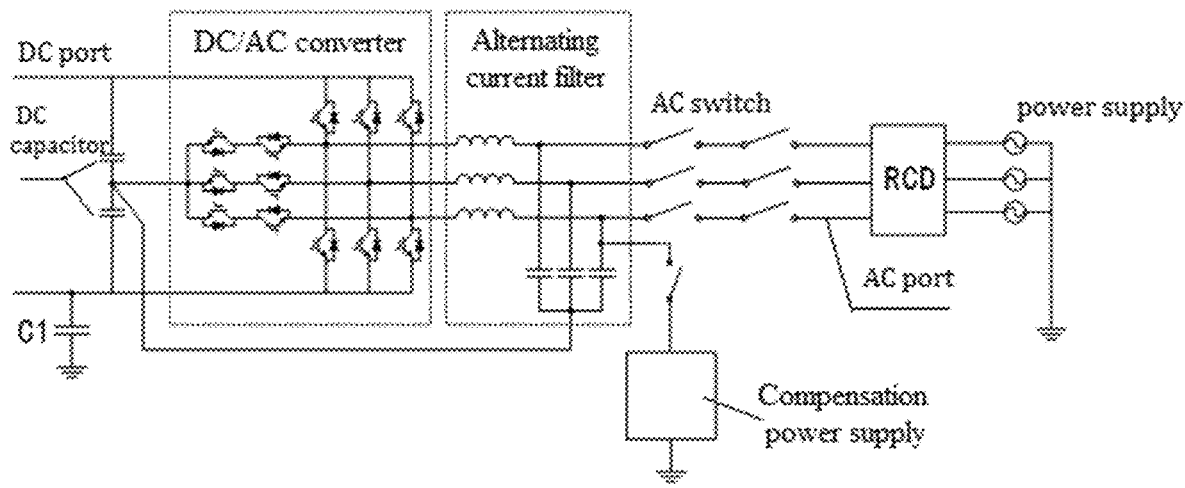
FIG. 2C is a schematic structural diagram of a third main circuit of the three-phase T-type three-level inverter connected with the TN type grid according to an embodiment of the present disclosure.
Figure 3:
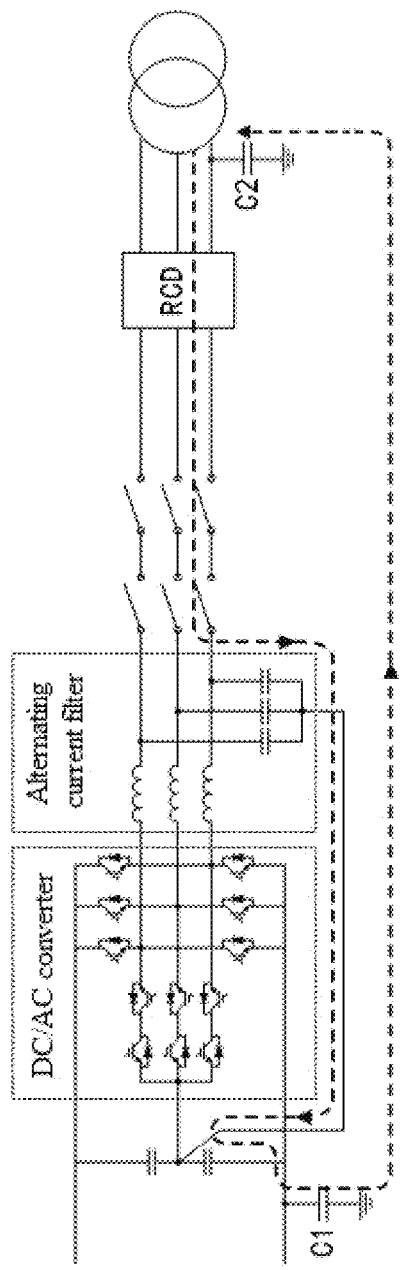
FIG. 3 is a schematic structural diagram of a main circuit of a three-phase T-type three-level inverter connected with an IT type grid according to an embodiment of the present disclosure.

The main circuit includes a direct current port, a direct current bus capacitor, a DC/AC converter, an alternating current filter, an alternating current switch and an alternating current port, as shown in FIG. 2A to FIG. 3.

Outside of the direct current port is connected with a direct current power supply. The direct current power supply may be at least one of a photovoltaic array, a wind power generation system and an energy storage system. In this case, outside of the alternating current port is connected with an alternating current power supply and/or an alternating current load. Alternatively, the outside of the direct current port is connected with a direct current load. In this case, the inverter acquires power from the alternating current power supply of the alternating current port to supply power to the direct current load. In this case, the inverter may be called a rectifier.

The direct current bus capacitor is connected between a positive pole of the direct current bus and a negative pole of the direct current bus. As shown in FIG. 2A to FIG. 3, the direct current bus capacitor includes two capacitors connected in series. One end of a branch formed by the two capacitor connected in series is connected to the positive pole of the direct current bus, the other end of the branch is connected to the negative pole of the direct current bus, and a midpoint of the branch is a midpoint of the direct current bus.

The direct current side of the DC/AC converter is connected with the positive pole, the midpoint, and the negative pole of the direct current bus of the inverter. In practical applications, the positive pole and the negative pole of the direct current bus may function as a direct current port. Practically, a DC/DC converter or a direct current filter may be arranged between the direct current port of the inverter and the direct current bus of the inverter, which is not limited herein. Specific configurations are determined depending on specific application environments, and the configurations applicable to the present disclosure fall within the protection scope of the present disclosure.

One end of the alternating current switch is connected to an alternating current side of the DC/AC converter via the alternating current filter, and the other end of the alternating current switch is connected to inside of the alternating current port. In practical applications, the alternating current switch may be a mechanical alternating current switch such as a relay and contactor. The alternating current switch is not limited and is determined according to specific application environments. Different types of alternating current switch each fall within the protection scope of the present disclosure.

Based on conventional technologies, a compensation power supply is arranged in the inverter according to the present disclosure. The compensation power supply may be theoretically arranged between any point of the main circuit of the inverter and ground. For example, the compensation power supply may be arranged on the negative pole of the direct current bus (as shown in FIG. 2A), may be arranged at the midpoint of the direct current bus as shown in FIG. 2B), or may be arranged on an alternating current output phase line (as shown in FIG. 2C). In practical applications, the compensation power supply may also be arranged on the positive pole of the direct current bus, the positive pole of the direct current port, the negative pole of the direct current port of the inverter and other output phase lines on the alternating side of the DC/AC converter, as long as the compensation power supply outputs a voltage to the main circuit in response to control of a controller. Positions of the compensation power supply are not limited herein, and are determined depending on specific application environments. The compensation power supply arranged at different positions falls within the protection scope of the present disclosure.

Figure 4:
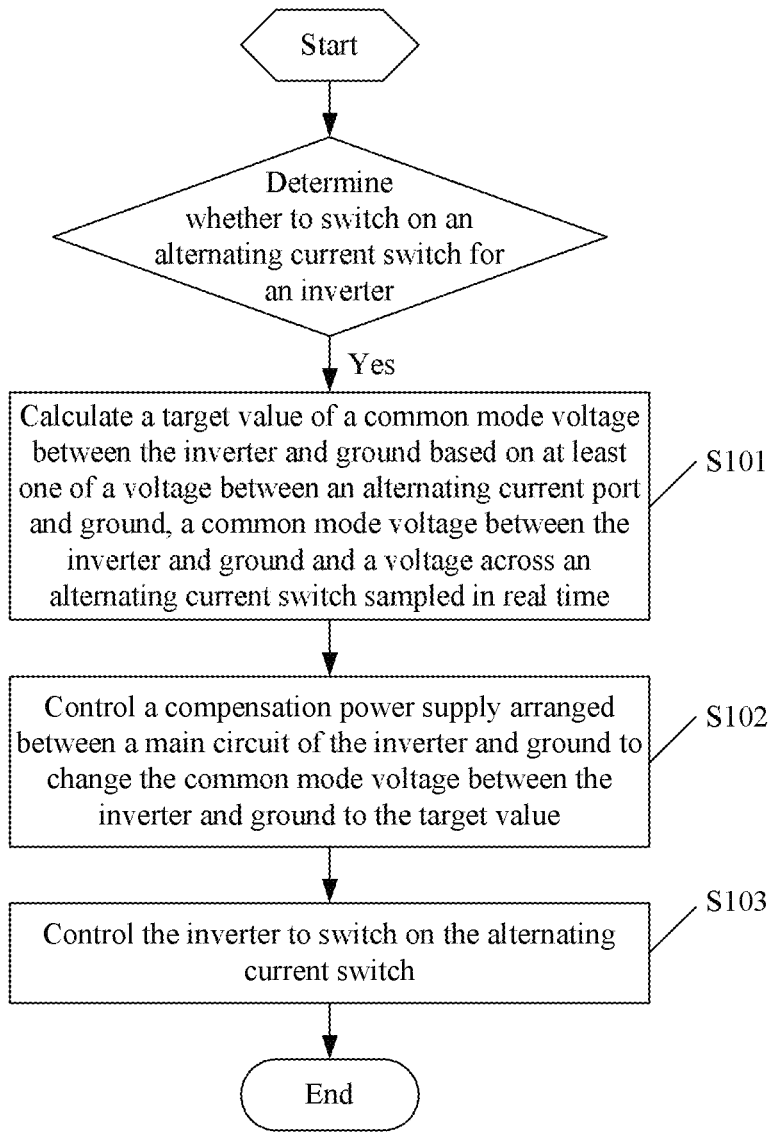
FIG. 4 is a flowchart of a method for suppressing a common mode impulse current for an inverter generated when an alternating current switch is switched on according to an embodiment of the present disclosure.

A controller of the inverter can control operations of the DC/AC converter, the compensation power supply and the switch device, and can perform a method for suppressing a common mode impulse current for the inverter generated when the alternating current switch is switched on as shown in FIG. 4, thereby solving the problem that the inverter is disconnected from the grid and is in a fault condition, due to the common mode impulse current for the inverter generated when the alternating current switch is switched on. In practical applications, the above method may be performed by other controllers such as a system controller or an extra independent controller. Controllers for performing the method are not limited herein and are determined depending on specific application environments. Various appropriate controllers fall within the protection scope of the present disclosure.

Referring to FIG. 4, the method for suppressing a common mode impulse current for an inverter generated when an alternating current switch is switched on, includes steps S101, S102 and S103.

In step S101, before the alternating current switch is switched on for the inverter, a target value of a common mode voltage between the inverter and ground is calculated based on at least one of a voltage between an alternating current port and ground, a voltage between the inverter and ground and a voltage across the alternating current switch sampled in real time.

The operation of switching on the alternating current switch refers to that an alternating current switch between an alternating current filter of the inverter and an interface for a power grid is switched on.

As shown in FIG. 2A to FIG. 2C, in a case that the alternating current port of the inverter is connected to a TN type grid, a sampled voltage between the alternating current port and ground is zero since a common mode voltage between the alternating current power grid and ground is zero. In order to ensure that a common voltage difference between two ends of the alternating current switch is zero in a case that the alternating current switch is switched on, a common mode voltage between the inverter and ground is required to be identical to the voltage between the alternating current port and ground. Therefore, the calculated target value of the common mode voltage between the inverter and ground is zero.

As shown in FIG. 3, in a case that the alternating current port of the inverter is connected to an IT type grid, in the alternating current side, the common mode impulse current generated when the alternating current switch is switched on passes through an alternating current Y capacitor or a parasitic capacitor to ground (which is uniformly expressed by C2 in FIG. 3) to form a loop. The alternating current Y capacitor or the parasitic capacitor to ground C2 may indicate other power generation device or electrical load at the power grid side. Moreover, as the number of devices or loads increases, an equivalent value of C2 becomes greater, that is, the common mode impulse current generated when the alternating current switch is switched on becomes greater. According to the sampled voltage between the alternating current port and ground, an average voltage V1 between the alternating current port and ground is calculated. In order to ensure that common mode voltage difference between two ends of the alternating current switch when the alternating current switch is switched on is zero, the average voltage V1 between the alternating current port and ground is required to function as a target value of a common mode voltage between the inverter and ground on another side of the alternating current switch. The average voltage V1 between the alternating current port and ground is an average value of voltages between the alternating current port and ground, i.e., an average value of a common mode voltage between the alternating current power grid and ground. The average voltage V1 between the alternating current port and ground may be obtained by sampling voltages to ground for a single phase and calculating an average value of voltages to ground for the single phase every 20 ms. Alternatively, the average voltage V1 between the alternating current port and ground may also be obtained by sampling voltages to ground for three phases and calculating an average value of the voltages to ground for three phases. If the power grid includes N lines (transformer neutral point taps), an average value of voltages between the N lines and ground may be sampled as the average voltage V1 between the alternating current port and ground. The average voltage V1 between the alternating current port and ground may also be obtained by connecting three devices with equal impedance to a three phase power grid to form a star impedance, sampling and calculating an average value of voltages between a neutral point of the star impedance and ground. The manner for obtaining the average voltage V1 is not limited herein, and is determined depending on specific application environments. Various manners for obtaining the average voltage V1 fall within the protection scope of the present disclosure.

In practical applications, if a voltage sampling circuit is provided at two ends of the alternating current switch, a voltage $V_i$ across two ends of the alternating current switch, i.e., a common mode voltage difference between two ends of the alternating current switch, is directly sampled. For example, the voltage $V_i$ across two ends of the alternating current switch is sampled for n times, and an average value is calculated according to $(\Sigma_{i=1}{}^n V_i)/n$. A sum of a common mode voltage between the inverter and ground sampled in real time and the average value functions as the target value of the common mode voltage between the inverter and ground on another side of the alternating current switch. In which, n represents the number of times for sampling the voltage between two ends of the alternating current switch, n is a multiple of m; m represents the number of sample points for sampling the voltage between two ends of the alternating current switch in one full alternating current voltage waveform, for example, 200. In addition, both n and m are positive integers. Values of n and m are determined depending on specific application environments, and various appropriate values of n and m fall within the protection scope of the present disclosure.

In step S102, a compensation power supply arranged between a main circuit of the inverter and ground is controlled to change the common mode voltage between the inverter and ground to the target value.

As shown in FIG. 2A, illustration is made by taking an inverter whose alternating current port is connected to a TN type grid as an example. It is assumed that a voltage of a direct current bus of the inverter is $V_{dc}$. In order to change the common mode voltage between the inverter and ground to the target value zero, the compensation power supply is required to output a voltage of $-V_{dc}/2$, namely, a voltage between the negative pole of the direct current bus and ground is $-V_{dc}/2$. In this case, a voltage between the positive pole of the direct current bus and ground is $V_{dc}/2$, and thus the common mode voltage between the inverter and ground equals to $(V_{dc}/2 - V_{dc}/2)/2 = 0$ and the common mode voltage difference between two ends of the alternating current switch equals to zero, thereby removing the common mode impulse current generated when the alternating current switch is switched on.

For an inverter whose alternating current port is connected to an IT type grid, as shown in FIG. 3, the compensation power supply is required to adjust the common mode voltage between the inverter and ground to V1, so that the common mode voltage difference between two ends of the alternating current switch becomes zero, thereby removing the common mode impulse current generated when the alternating current switch is switched on.

In step S103, the inverter is controlled to switch on the alternating current switch.

After the common mode voltage difference between two ends of the alternating current switch is zero, the alternating current switch is controlled to be switched on, thereby removing the common mode impulse current generated when the alternating current switch is switched on in conventional technologies.

With the method for suppressing a common mode impulse current for an inverter generated when the alternating current switch is switched on according to the embodiment, before the alternating current switch is switched on for the inverter, the common mode voltage between the inverter and ground is adjusted via a direct current compensation power supply to ground, to remove the common mode voltage difference between two ends of the alternating current switch. Then the alternating current switch is switched on, thereby removing the common mode impulse current generated when the alternating current switch is switched on, solving the problems in the conventional technologies of false triggering of a trip resulting from an external leakage current protector caused by the common mode impulse current generated when the alternating current switch is switched on, a transient interference on the controlling system, and a large current impact on hardware circuits inside the inverter, and thus improving reliability of the inverter.

It should be noted that, the inverter topologies shown in FIG. 2A to FIG. 3 are just exemplary. The method for suppressing a common mode impulse current for an inverter generated when the alternating current switch is switched on according to the present embodiment may also be applied to a two-level inverter, a Neutral-Point-Clamped three-level inverter, a five-level inverter, a single phase H bridge inverter and inverters with other topologies, which all fall within the protection scope of the present disclosure.

A method for suppressing a common mode impulse current for an inverter generated when the alternating current switch is switched on is provided according to another embodiment of the present disclosure. Based on the above embodiments and FIG. 2A to FIG. 4, in an embodiment, after step S102 of controlling a compensation power supply arranged between a main circuit of the inverter and ground to change the common mode voltage between the inverter and ground to a target value, the method further includes step S201.

In step S201, a switch in series connection with the compensation power supply and arranged between the main circuit of the inverter and ground is controlled to be switched off.

Figure 5:
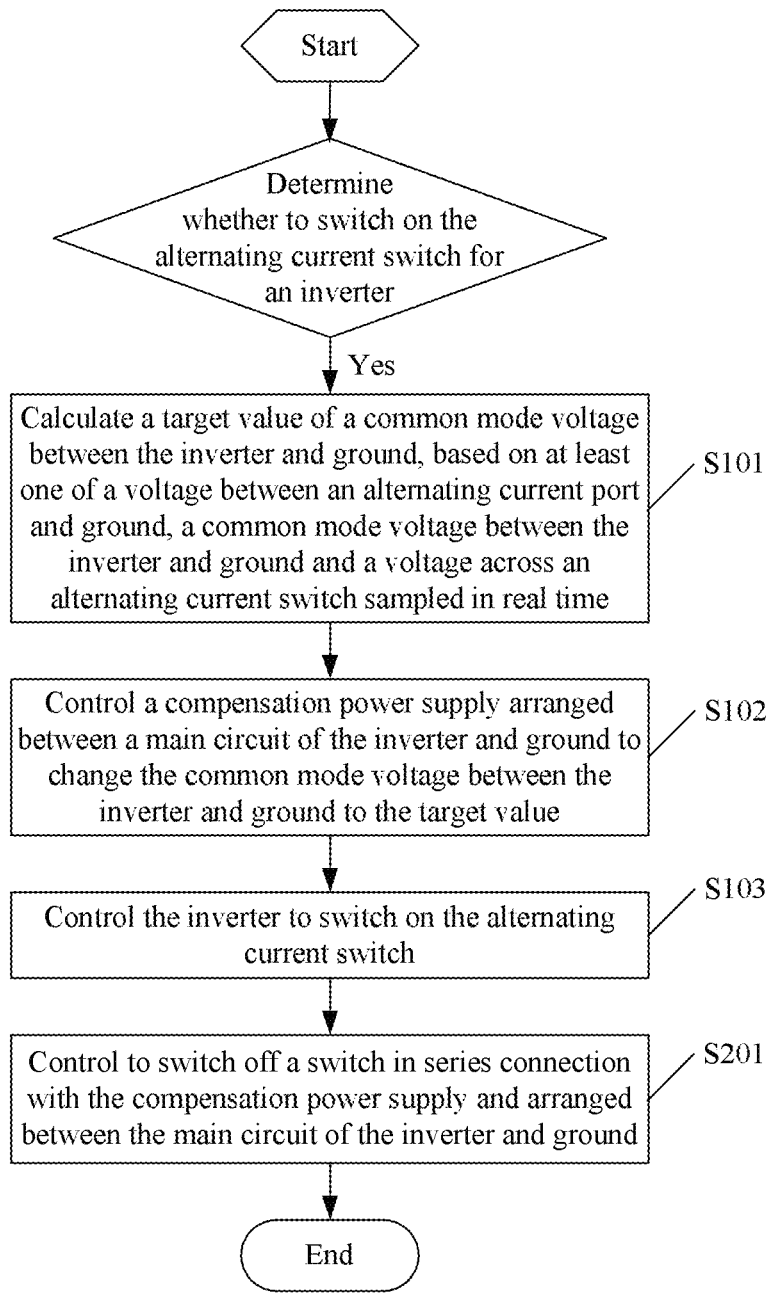
FIG. 5 is another flowchart of the method for suppressing a common mode impulse current for an inverter generated when an alternating current switch is switched on according to an embodiment of the present disclosure.

It should be noted that, step S201 may be performed before step S103, that is, the compensation power supply is switched off before connecting to a power grid. Alternatively, in a preferred embodiment, step S201 may be performed after step S103 (as shown in FIG. 5). That is, after the alternating current switch of the inverter is switched on, the compensation power supply is disconnected from the main circuit of the inverter (as shown in FIG. 2A to FIG. 2C) or ground (not shown) to remove a leakage current flowing through the compensation power supply after the alternating current switch is switched on.

Figure 6:
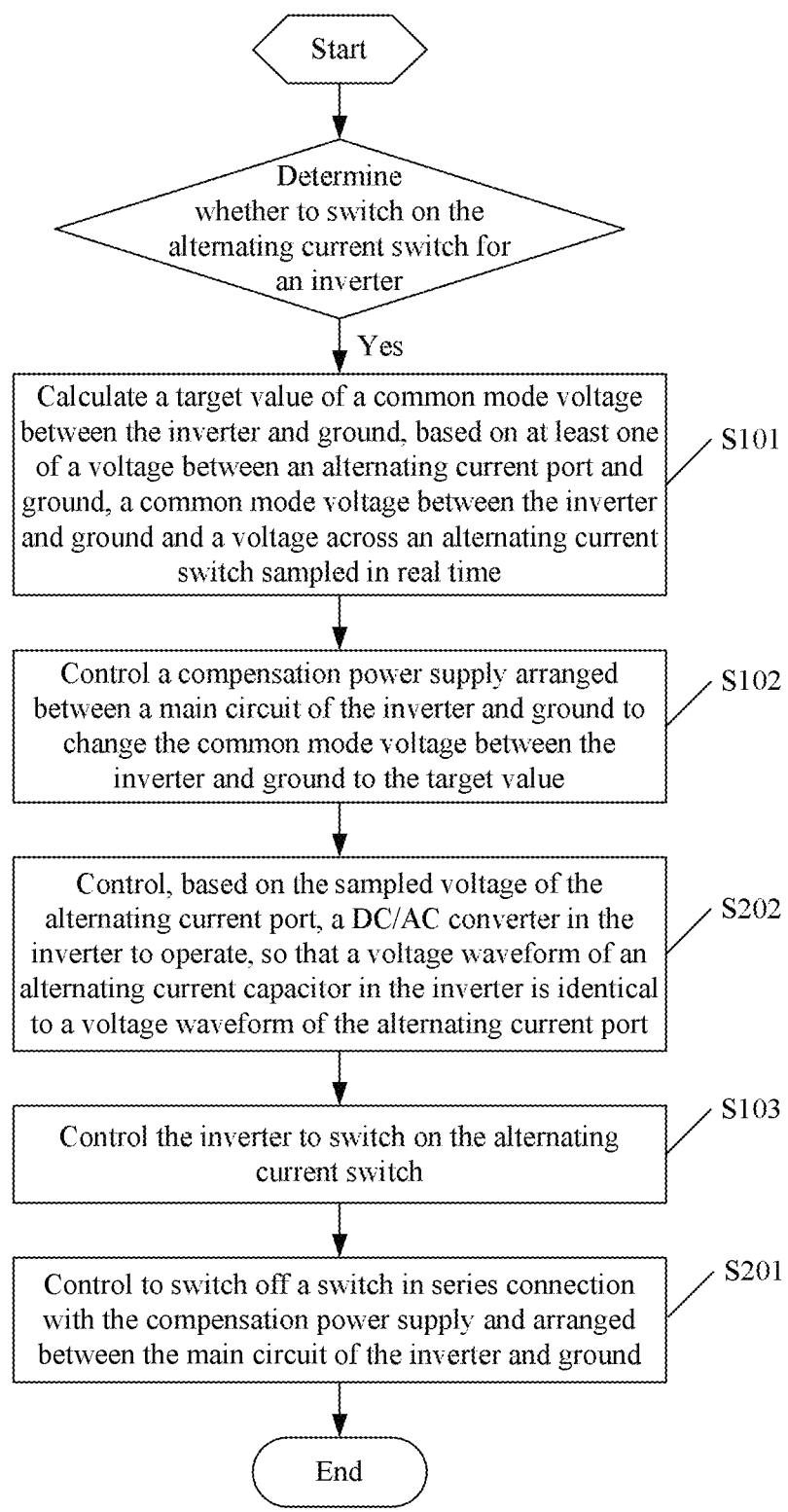
FIG. 6 is a third flowchart of the method for suppressing a common mode impulse current for an inverter generated when an alternating current switch is switched on according to an embodiment of the present disclosure.

Moreover, in order to further improve reliability of grid connection, a differential mode voltage difference is removed after the common mode voltage difference between two ends of the alternating current switch is removed, to remove a differential mode current impact generated when the alternating current switch is switched on. Based on the above embodiments and FIG. 2A to FIG. 5, as shown in FIG. 6 (which is shown based on FIG. 5), preferably, the method for suppressing a common mode impulse current for an inverter generated when the alternating current is switched on may further include step S202 before step S103 of controlling the inverter to switch on the alternating current switch.

In step S202, a DC/AC converter in the inverter is controlled to operate based on the sampled voltage between the alternating current port and ground, so that a voltage waveform of an alternating current capacitor in the inverter equals to a voltage waveform of the alternating current port.

Illustration is made by taking the inverter whose alternating current port is connected to a TN type grid shown in FIG. 2A to FIG. 2C for example. After the common mode voltage is compensated for the inverter, the DC/AC converter is controlled to generate a differential mode voltage with the same peak-to-peak value, frequency, and phase as those of the voltage of the alternating current power grid in the alternating current capacitor, namely in a differential mode capacitor of the alternating current filter, based on the sampled voltage between the alternating current port and ground, namely a voltage of the alternating current power grid. Then, the alternating current switch is switched on. In this case, both the common mode impulse current and the differential mode impulse current are removed, thereby ensuring no current impact on the hardware circuit inside the inverter.

Alternatively, based on the above embodiments and FIG. 2A to FIG. 6, in another preferred embodiment, if the direct current side of the inverter is connected with a photovoltaic module and in the case that it is unnecessary to switch on the alternating current switch, for example, at night, the compensation power supply may be controlled to perform a PID repair on the photovoltaic module. That is, the method for suppressing a common mode impulse current for an inverter generated when the alternating current switch is switched on further includes the following steps.

If the direct current port of the inverter is connected to a P-type photovoltaic module, the compensation power supply is controlled to change both a voltage between the positive pole of the direct current port and ground and a voltage between the negative pole of the direct current port and ground to positive voltages, that is, controlling an output voltage of the compensation power supply so that the voltage between the photovoltaic module and ground is positive, in a case that it is unnecessary to switch on the alternating current switch for the inverter.

If the direct current port of the inverter is connected to an N-type photovoltaic module, the compensation power supply is controlled to change both the voltage between the positive pole of the direct current port and ground and the voltage between the negative pole of the direct current port and ground to negative voltages, that is, controlling an output voltage of the compensation power supply so that the voltage between the photovoltaic module and ground is negative, in a case that it is unnecessary to switch on the alternating current switch for the inverter.

By the process above, the compensation power supply can suppress the common mode impulse current and achieve PID repair on the photovoltaic modules, thereby saving a cost and being beneficial to promote.

Other principles are identical to those of the above embodiments, which are not repeated herein.

An inverter is further provided according to another embodiment of the present disclosure. The inverter includes a main circuit and a controller.

As shown in FIG. 2A to FIG. 4, the main circuit comprises a direct current port, a direct current bus capacitor, a DC/AC converter, an alternating current filter, an alternating current switch, an alternating current port and a compensation power supply. Outside of the direct current port is connected with a direct current power supply or a direct current load. The direct current bus capacitor is connected between the positive pole of the direct current bus and the negative pole of the direct current bus of the inverter. The direct current side of the DC/AC converter is connected with the positive pole and the negative pole of the direct current bus of the inverter. The alternating current side of the DC/AC converter is connected with one end of the alternating current switch through the alternating current filter. Another end of the alternating current switch is connected with inside of the alternating current port. The outside of the alternating current port is connected with an alternating current power supply or an alternating current load. The compensation power supply is arranged between the main circuit and ground, and is configured to output a voltage to the main circuit in response to control of the controller.

It should be noted that, a three-phase T-type three-level inverter topology with an alternating current capacitor connected to the midpoint of the direct current bus shown in FIG. 2a to FIG. 3 is only exemplary. In practical applications, the DC/AC converter in the main circuit of the inverter may have a two-level inverter topology, a Neutral-Point-Clamped three-level inverter topology, a five-level inverter topology, a single phase H-bridge inverter topology and other inverter topologies, which fall within the protection scope of the present disclosure.

In an embodiment, the main circuit of the inverter further includes a DC/DC converter arranged between the inside of the direct current port and the direct current bus. In practical applications, the main circuit of the inverter may be provided with a direct current filter. Configurations of the inverter are not limited herein, and are determined depending on specific application environments. The inverters with various configurations fall within the protection scope of the present disclosure.

The controller is configured to perform the method for suppressing a common mode impulse current for an inverter generated when the alternating current switch is switched on according to any one of the embodiments described above. For the performing process and principle of the method for suppressing a common mode impulse current for an inverter generated when the alternating current switch is switched on, one may refer to the above embodiments. Details are not repeated herein.

A new energy grid-connected power generation system is further provided according to another embodiment of the present disclosure, including a direct current power supply and the inverter according to the above embodiments. The direct current power supply is connected with a direct current port of the inverter. The direct current power supply is at least one of a photovoltaic array, a wind power generation system and an energy storage system.

For the structure and operation principles of the inverter, one may refer to the above embodiments, and details are not repeated.

It should be noted that, in practical applications, the method for suppressing a common mode impulse current for an inverter generated when the alternating current switch is switched on is not limited to be performed by the controller of the inverter. The method may also be performed by other controllers, such as a system controller of the new energy grid-connected power generation system or an extra independent controller. The controllers for performing the above method are not limited herein, and are determined depending on specific application environments. Various appropriate controllers fall within the protection scope of the present disclosure.

The embodiments of the present disclosure are described in a progressive manner, and each embodiment places emphasis on the difference from other embodiments. Therefore, the embodiments may be referred to each other for the same or similar parts. Since the device according to embodiments of the present disclosure corresponds to the method according to embodiments of the present disclosure, the descriptions of the device are relatively simple. For the relevant part, one may refer to the description of the method.

The foregoing embodiments are only preferred embodiments of technical solutions in the present disclosure. The preferred embodiments are disclosed above, but they are not intended to limit the present disclosure. With the method and technical content disclosed above, those skilled in the art can make many variations and improvements to the technical solutions of the present disclosure, or make some equivalents on the embodiments without departing from the scope of technical solutions of the present disclosure. All simple modifications, equivalent variations and improvements made based on the technical essence of the present disclosure without departing from the content of the technical solutions of the present disclosure fall within the protection scope of the technical solutions of the present disclosure.

The invention claimed is:
1. A method for suppressing a common mode impulse current for an inverter generated when an alternating current switch is switched on,
wherein:
the inverter comprises a main circuit and a controller;
the main circuit comprises a direct current (DC) port, a direct current bus capacitor (C1), a DC/AC converter, an alternating current filter, an alternating current (AC) switch, an alternating current (AC) port and a compensation power supply;
outside of the direct current port is connected with a direct current power supply or a direct current load;
the direct current bus capacitor is connected between a positive pole of a direct current bus and a negative pole of the direct current bus of the inverter;
an alternating current side of the DC/AC converter is connected with one end of the alternating current switch through the alternating current filter;
another end of the alternating current switch is connected with inside of the alternating current port;
outside of the alternating current port is connected with an alternating current power supply or an alternating current load;
the compensation power supply is arranged between the main circuit and ground, and is configured to output a voltage to the main circuit in response to control of the controller;
wherein the method comprises:
calculating (S101), by the controller, before the alternating current switch is switched on for the inverter, a target value of a common mode voltage between the inverter and ground, based on at least one of a voltage between the alternating current port and ground and a voltage across the alternating current switch sampled by a voltage sampling circuit in real time;
controlling (S102), by the controller, a compensation power supply arranged between the main circuit of the inverter and ground to change the common mode voltage between the inverter and ground to the target value; and
controlling_(S103) controller, the inverter to switch on the alternating current switch.

2. The method according to claim 1, wherein after the controlling (S102), by the controller a compensation power supply arranged between the main circuit of the inverter and ground to change the common mode voltage between the inverter and ground to the target value, the method further comprises:
controlling (S201), by the controller, to switch off the alternating current switch in series connection with the compensation power supply and arranged between the main circuit of the inverter and ground.

3. The method according to claim 1, wherein before the controlling (S103), by the controller, the inverter to switch on the alternating current switch, the method further comprises:
controlling (S202), by the controller, the DC/AC converter in the inverter to operate based on the sampled voltage between the alternating current port and ground, such that a voltage waveform of the alternating current capacitor in the inverter is identical to a voltage waveform of the alternating current port.

4. The method according to claim 1, wherein in a case that the alternating current port of the inverter is connected to a TN earthing system, the target value is zero.

5. The method according to claim 1, wherein in a case that the alternating current port of the inverter is connected to an IT earthing system, the target value equals to an average value of voltages between the alternating current port of the inverter and ground.

6. The method according to claim 1, further comprising:
controlling, by the controller, if the direct current port of the inverter is connected to a P-type photovoltaic module, the compensation power supply to change both a voltage between a positive pole of the direct current port of the inverter and ground and a voltage between a negative pole of the direct current port of the inverter and ground to positive voltages, in a case that it is unnecessary to switch on the alternating current switch for the inverter; and controlling, by the controller, if the direct current port of the inverter is connected to an N-type photovoltaic module, the compensation power supply to change the voltage between the positive pole of the direct current port of the inverter and ground and the voltage between the negative pole of the direct current port of the inverter and ground to negative voltages, in a case that it is unnecessary to switch on the alternating current switch for the inverter.

7. The method according to claim 1, wherein one end of the compensation power supply is grounded and another end of the compensation power supply is connected with any one of the positive pole of the direct current bus, the negative pole of the direct current bus, a midpoint of the direct current bus, a positive pole of the direct current port, a negative pole of the direct current port and the alternating current side of the DC/AC converter of the inverter.

* * * * *